(12) United States Patent
Krishna et al.

(10) Patent No.: US 9,379,982 B1
(45) Date of Patent: Jun. 28, 2016

(54) ADAPTIVE STATELESS LOAD BALANCING

(71) Applicant: Juniper Networks, Inc., Sunnyvale, CA (US)

(72) Inventors: Gopi Krishna, Tracy, CA (US); Suresh Kumar Vinapamula Venkata, Sunnyvale, CA (US); Shauli Gal, Mountain View, CA (US); Li Fang, San Jose, CA (US); Harsha Srinath, Fremont, CA (US); Sanjay Agrawal, San Ramon, CA (US); Jwala Dinesh Gupta Chakka, Sunnyvale, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 294 days.

(21) Appl. No.: 14/042,676

(22) Filed: Sep. 30, 2013

(51) Int. Cl.
*H04L 12/803* (2013.01)

(52) U.S. Cl.
CPC .................................... *H04L 47/125* (2013.01)

(58) Field of Classification Search
CPC .. H04L 47/125; H04L 67/1002; H04W 28/08
USPC ........................................................ 370/217
See application file for complete search history.

(56) References Cited

U.S. PATENT DOCUMENTS

| | | | |
|---|---|---|---|
| 2014/0105031 A1* | 4/2014 | McDysan | H04L 45/302 370/242 |
| 2014/0310418 A1* | 10/2014 | Sorenson, III | H04L 67/1002 709/226 |

OTHER PUBLICATIONS

"Service Delivery Gateway" Fact Sheet, Juniper Networks, Inc., Feb. 2011, 4 pgs.
"Service Delivery Gateway Solution"0 Juniper Networks, Inc., 2011, 151 pgs.

* cited by examiner

*Primary Examiner* — Pao Sinkantarakorn
*Assistant Examiner* — Richard Chang
(74) *Attorney, Agent, or Firm* — Shumaker & Sieffert, P.A.

(57) ABSTRACT

In general, techniques are described for load balancing, with a service node, packet flows using stateless load balancing that adapts to server failure to provide flow affinity to initially selected servers for the duration of respective flows. In one example, service node device applies stateless load balancing to packet flows to distribute the flows among a plurality of servers. The service node determines a failure of a failed server and then receives an initial packet of a packet flow from the packet flows and forwards the initial packet to an active server. The service node generates a mapping of the packet flow to the active server, determines a recovery of the failed server, receives a subsequent packet of the packet flow, and forwards the subsequent packet of the packet flow to the active server based at least on the mapping of the packet flow to the active server.

20 Claims, 6 Drawing Sheets

ADAPTIVE STATELESS LOAD BALANCING

TECHNICAL FIELD

The disclosure relates to computer networks and, more specifically, to load balancing packet flows transported by computer networks.

BACKGROUND

A network service provider offers services to subscribers that access a service provider core network using an access network. Services offered may include, for example, traditional Internet access, Voice-over-Internet Protocol (VoIP), video and multimedia services, and security services. The service provider network may support multiple types of access network infrastructures that connect to service provider network access gateways to provide access to the offered services. Services may also be offered by a third-party content provider, e.g., to which the service provider offers connectivity.

Heterogeneous access networks connect many thousands of subscribers to any number of access gateway types, such as Broadband Remote Access Servers (BRASs), Cable Modem Termination Systems (CMTSs), and Gateway GPRS Support Nodes (GGSNs), that may have varying capabilities and scalability limitations and yet face ever-increasing demands for both subscriber connection management and subscriber-specific traffic management services. Although an access gateway, as a connection terminus and thus a transport node for all subscriber traffic for a particular subscriber device, is an established location at which to perform subscriber-specific traffic management services, coupling subscriber access and traffic management at an access gateway may restrict or prevent independent scaling and independent optimization of these disparate functions.

As a result, a service provider may deploy one or more service nodes in the service provider (SP) core network, upstream from the access gateways, to route traffic through the network to servers that provide the subscriber services and to apply carrier edge services such as firewall, carrier grade network address translation (CG-NAT), and load balancing of packet flows for subscribers among one or more servers that provide the subscriber services. In this way, the service nodes are decoupled from the subscriber access management functions and thus may be optimized for service processing.

SUMMARY

In general, techniques are described for load balancing packet flows using stateless load balancing that adapts to server failure to provide flow affinity to initially selected servers for the duration of respective flows. In some examples, a service node uses an enhanced hash function to distribute each of the packet flow packets according to a hash of the packet (e.g., the n-tuple) in the steady state. Each hash index for the hash function maps to one of a plurality of servers that redundantly provide a subscriber service. If one of the servers fails, the service node redistributes the hash indexes mapped to the failed server to the remaining, active servers. Each redistributed hash index is thus at least temporarily mapped to a substitute server.

The service node marks the redistributed hash indexes to prescribe flow learning for any flows hashed to the redistributed hash indexes. If flow learning is prescribed for a particular hash index, the service node stores a mapping to a flow table for any flow hashed to that hash index while flow learning is required. Each mapping maps a flow to the substitute server for a redistributed hash index to facilitate flow affinity for subsequent packets of the flow that are received by the service node. When performing stateless load balancing for a packet for a flow, the service node first queries the flow table to determine whether a mapping for the flow is stored to the flow table and, if so, send the packet to the substitute server to which the flow is mapped in the flow table. After a failed server recovers, the service node restores the redistributed hash indexes such that the service node directs future flows mapped to the restored hash index to the recovered server, as in the steady state condition. The service node may in this way use limited flow learning to improve the resiliency of the stateless load balancing service.

In one aspect, a method includes applying stateless load balancing, by a service node, to packet flows to distribute the packet flows among a plurality of servers that provide a common service and are associated, by the service node, with a common interface by which a subscriber device may access the common service, wherein the packet flows are directed to the common interface. The method also includes determining, by a service node, a failure of a failed server from the plurality of servers. The method also includes after determining the failure of the failed server and by the service node, receiving an initial packet of a packet flow from the packet flows and forwarding the initial packet to an active server from the plurality of servers. The method also includes generating, by the service node, a mapping of the packet flow to the active server. The method also includes determining, by the service node, a recovery of the failed server. The method also includes after determining the recovery of the failed server and by the service node, receiving a subsequent packet of the packet flow and forwarding the subsequent packet of the packet flow to the active server based at least on the mapping of the packet flow to the active server generated by the service node.

In another aspect, a device includes at least one network interface card and a control unit comprising a processor and configuration data, wherein the configuration data associates a plurality of servers that provide a common service with a common interface by which a subscriber device may access the common service. The device also includes a forwarding unit coupled to the control unit and to the at least one network interface card, wherein the forwarding unit comprises a forwarding component configured to apply stateless load balancing to packet flows to distribute the packet flows among the plurality of servers, wherein the packet flows are directed to the common interface. The device also includes a load balancer process executed by the control unit and configured to determine a failure of a failed server from the plurality of servers. The forwarding component is further configured to, after the load balancer process determines the failure of the failed server, receive an initial packet of a packet flow from the packet flows and forward the initial packet to an active server from the plurality of servers. The forwarding component is further configured to generate a mapping of the packet flow to the active server and store the mapping to a flow table. The load balancer process is further configured to determine a recovery of the failed server. The forwarding component is further configured to, after the load balancer process determines the recovery of the failed server, receive a subsequent packet of the packet flow and forward the subsequent packet of the packet flow to the active server based at least on the mapping of the packet flow to the active server generated by the forwarding component and stored to the flow table.

In another aspect, a non-transitory computer-readable medium contains instructions. The instructions cause one or more programmable processors to apply stateless load balancing, by a service node, to packet flows to distribute the packet flows among a plurality of servers that provide a common service and are associated, by the service node, with a common interface by which a subscriber device may access the common service, wherein the packet flows are directed to the common interface. The instructions further cause the programmable processors to determine, by a service node, a failure of a failed server from the plurality of servers. The instructions further cause the programmable processors to, after determining the failure of the failed server and by the service node, receive an initial packet of a packet flow from the packet flows and forwarding the initial packet to an active server from the plurality of servers. The instructions further cause the programmable processors to generate, by the service node, a mapping of the packet flow to the active server. The instructions further cause the programmable processors to determine, by the service node, a recovery of the failed server. The instructions further cause the programmable processors to after determining the recovery of the failed server and by the service node, receive a subsequent packet of the packet flow and forwarding the subsequent packet of the packet flow to the active server based at least on the mapping of the packet flow to the active server generated by the service node.

The details of one or more embodiments of the invention are set forth in the accompanying drawings and the description below. Other features, objects, and advantages of the invention will be apparent from the description and drawings, and from the claims.

BRIEF DESCRIPTION OF DRAWINGS

Like reference characters denote like elements throughout the figures and text.

DETAILED DESCRIPTION

Figure 1A:
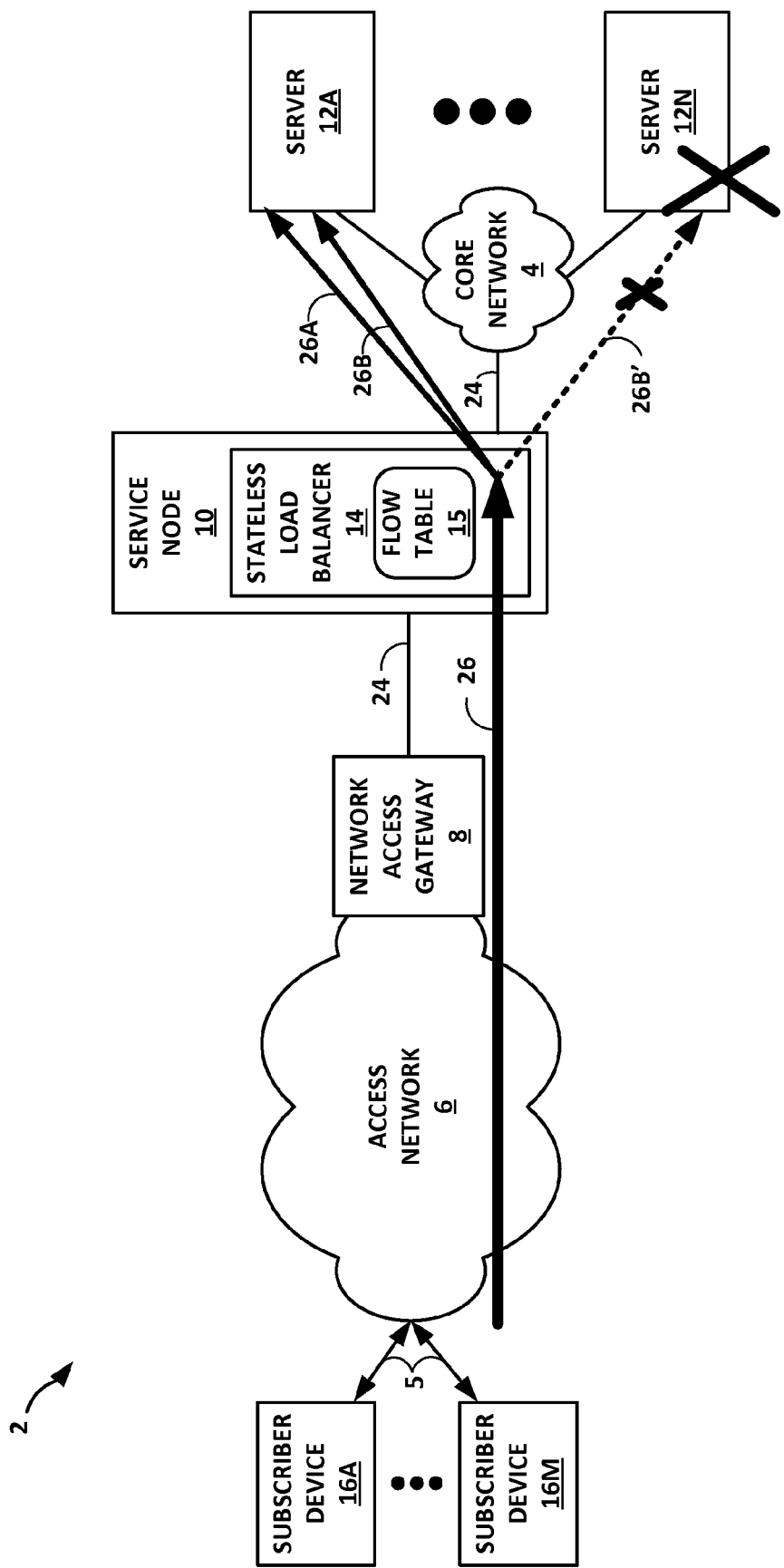
FIGS. 1A-1B are block diagrams each illustrating an example network system having a service node positioned upstream from an access network to apply load balancing services according to techniques described in this disclosure.
Figure 1B:
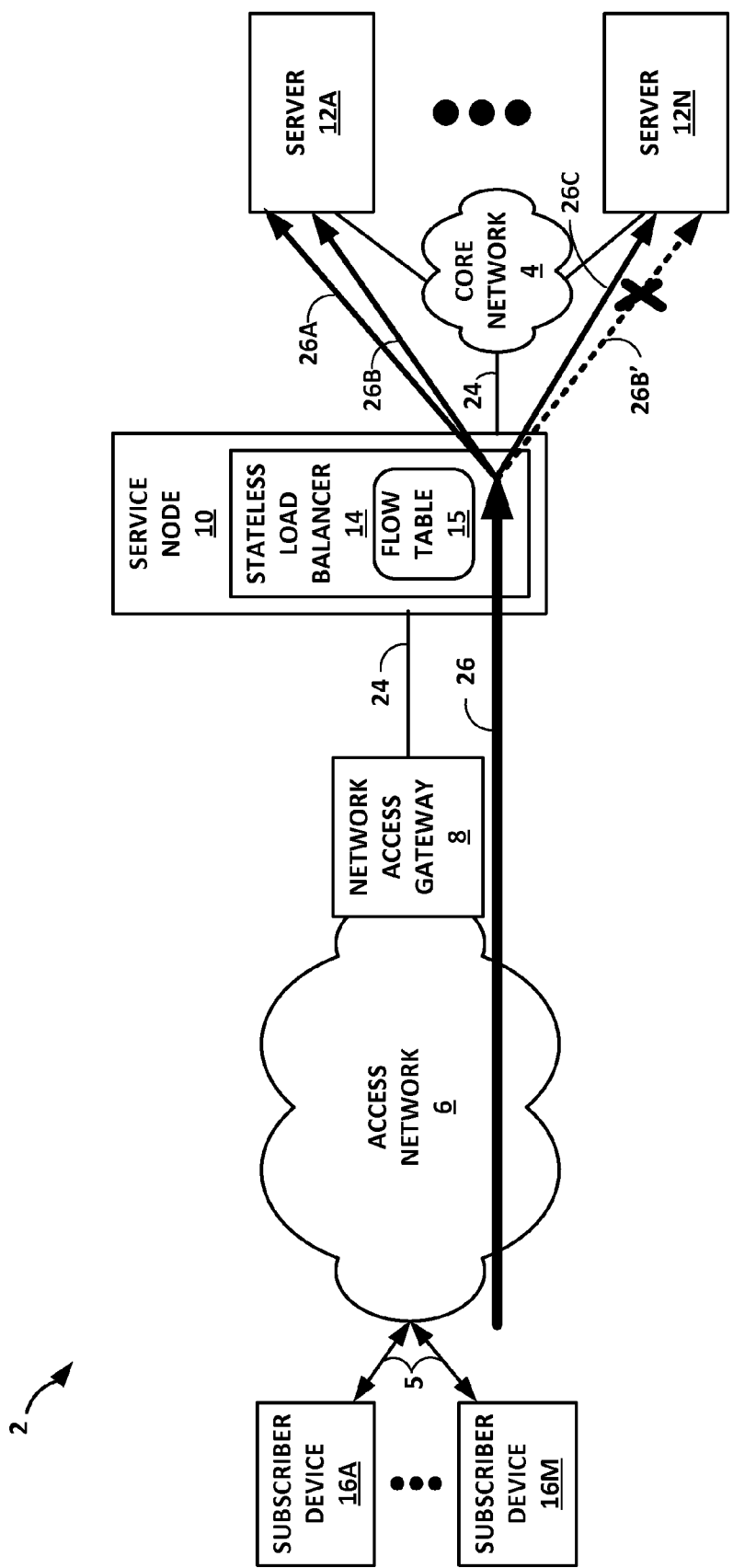

FIGS. 1A-1B are block diagrams illustrating an example network system 2 having a service node 10 positioned upstream from an access network 6 to apply load balancing services according to techniques described in this disclosure. In the example of FIGS. 1A-1B, service node 10 is coupled to access network 6 by way of network access gateway 8. However, FIGS. 1A-1B are merely exemplary and the techniques described herein may be used in other network configurations to provide carrier edge services, in particular stateless load balancing to packet flows accessing subscriber services. For example, services node 10, and the functionality described herein with respect to load balanced services, may be integrated within gateway 8 or other device of network system 2.

Servers 12A-12N (collectively, "servers 12") offer to subscriber devices 16A-16N (collectively, "subscriber devices 16") a subscriber service, such as traditional Internet access, Voice-over-Internet Protocol (VoIP), content delivery, video and multimedia services, data collection, and security services, for example. Some or all of servers 12 may represent a separate physical computing device, also referred to as "real servers." Alternatively, or in addition, some or all of servers 12 may represent different virtual machines executing on real servers. In some instances, one or more of servers 12 may each represent multiple servers, e.g., a server farm or cluster of a service complex provided by network system 2. Each of servers 12 may present an independent interface accessible to packets traversing core network 4. For example, each of servers 12 may be assigned a different network (IP) address that is addressable by service node 10. As another example, servers 12 may be identifiable according to a label switched path (LSP), pseudowire (PW), or other tunneling protocol tunnel identifier that service node 10 may use to forward traffic to an identified one of servers 12. Servers 12 may be part of a data center, service complex, and/or enterprise. In some examples, service node 10 may be located at or otherwise integrated within one or more devices of the data center or service complex.

Service provider core network 4 ("core network 4") offers packet-based connectivity to subscriber devices 16A-16M attached to access network 6 for accessing servers 12. Core network 4 may represent a public network that is owned and operated by a service provider to interconnect a plurality of networks, such as access network 6. Core network 4 may implement Multi-Protocol Label Switching (MPLS) forwarding and in such instances may be referred to as an MPLS network or MPLS backbone. In some instances, core network 4 represents a plurality of interconnected autonomous systems, such as the Internet, that offers services from one or more service providers. Furthermore, although illustrated as directly connected to core network 4, servers 12 may be located within an edge network coupled to core network 4, e.g., by a customer edge device such as customer edge switch or router.

A network service provider operates or in some cases leases elements of access network 6 to provide packet transport between subscriber devices 16 and network access gateway 8. Access network 6 represents a network that aggregates data traffic from one or more subscribers for transport to/from core network 4 of the service provider. Access network 6 includes network nodes that execute communication protocols to transport control and user data to facilitate communication between subscriber devices 16 and network access gateway 8. Access network 6 may include a broadband access network, cellular access network, a wireless LAN, a public switched telephone network (PSTN), or other type of access network. Examples of cellular access networks include networks conforming to a Universal Mobile Telecommunications System (UMTS) architecture, an evolution of UMTS referred to as Long Term Evolution (LTE), mobile IP standardized by the Internet Engineering Task Force (IETF), as well as other standards proposed by the $3^{rd}$ Generation Partnership Project (3GPP), $3^{rd}$ Generation Partnership Project 2 (3GGP/2) and the Worldwide Interoperability for Microwave Access (WiMAX) forum.

In examples of network system 2 that include a cellular access network as access network 6, network access gateway 8 may represent a mobile gateway, for example, a Gateway General Packet Radio Service (GPRS) Serving Node (GGSN), an Access Gateway (aGW), or a Packet Data Network (PDN) Gateway (P-GW). In such examples, interface 24 may represent a Gi and/or SGi interface (or "reference point"). In examples of network system 2 that include a wireline/broadband access network, network access gateway 8 may represent a Broadband Services Router (BSR) or a Broadband Remote Access Server (BRAS), for instance.

A network service provider that administers at least parts of network system 2 offers services to subscribers associated with devices, e.g., subscriber devices 16, that access the service provider network. Services offered may include, for example, traditional Internet access, Voice-over-Internet Protocol (VoIP), video and multimedia services, and security services. As described above with respect to access network 6, core network 4 may support multiple types of access network infrastructures that connect to service provider network access gateways to provide access to the offered services. In some instances, network system may include subscriber devices 16 that attach to multiple different access networks 6 having varying architectures yet all coupled by interface 24 to service node 10 that may be inline for packet flows between subscriber devices 16 and servers 12.

Subscriber devices 16A-16N (collectively, "subscriber devices 16") connect to network access gateway 8 via access network 6 to receive connectivity to subscriber services for applications hosted by subscriber devices 16. Each of subscriber devices 16 may comprise, for example, a mobile phone, a smart phone, a desktop/laptop computer, a gaming console, a video-conferencing suite, a workstation, a wireless device, a network-ready appliance, a file server, print server, a digital subscriber line (DSL) router, a cable modem, or another device with which to access services provided by network system 2, e.g., servers 12. A subscriber may represent, for instance, an enterprise, a residential subscriber, or a mobile subscriber. Subscriber devices 16 connect to access network via access links 5 that comprise wired and/or wireless communication link. The term "communication link," as used herein, comprises any form of transport medium, wired or wireless, and can include intermediate nodes such as network devices. Each of access links 5 may comprise, for instance, aspects of an asymmetric DSL network, WiMAX, a T-1 line, an Integrated Service Digital Network (ISDN), wired Ethernet, or a cellular radio link.

Any one or more of subscriber devices 16 may begin sending subscriber data traffic toward core network 4 in order to access and receive the service provided by servers 12, and such packets traverse service node 10 as part of at least one packet flow. Flows 26 illustrated in FIGS. 1A-1B represent one or more upstream packet flows from any one or more subscriber devices 16 and directed to the service interface (e.g., one or more IP addresses mapped to servers 12) for the service provided by servers 12. The term "packet flow," "traffic flow," or simply "flow" refers to a set of packets originating from a particular source device and sent to a particular destination device as part of a communication session between the source and destination device. A flow of packets, in either the upstream (sourced by one of subscriber devices 16) or downstream (destined for one of subscriber devices 16) direction, may be identified by the 5-tuple: <source network address, destination network address, source port, destination port, protocol>. This 5-tuple generally identifies a packet flow to which a received packet corresponds. An n-tuple refers to any n items drawn from the 5-tuple. For example, a 2-tuple for a packet may refer to the combination of <source network address, destination network address> or <source network address, source port> for the packet.

Service node 10 relays subscriber data traffic between access network 6 and core network 4. That is, service node 10 is upstream (i.e., core side) of access network 6 that terminates subscriber-specific connections so as to produce packet-based communications, e.g., Internet Protocol (IP) packets. Moreover, service node 10 is illustrated in the example topology of FIG. 1 as positioned between access network 6 and core network 4 that provides a packet-based infrastructure for accessing network resources, such servers 12. In this way, service node 10 may be considered an intermediate network device. Communication links of interface 24 couple service node 10 to access network 6 and core network 4. In some cases, all network traffic exchanged between access network 6 and servers 12 traverses service node 10 such that service node 10 may be considered inline between access network and servers 12. In some instances, service node 10 constitutes part of core network 4 as an intermediate network device to transport packets between access network 6 and other parts of core network 4. In some instances, service node 10 may represent an application delivery controller (ADC) or other network device that load balances packet flows among servers of a data center. In some instances, service node 10 may represent a services delivery gateway (SDG). As used herein, a "service node device" refers to any device, such as a server, appliance, service card or other component, or other computing device programmed to perform the functionality of service node 10 described herein.

In addition to relaying traffic, service node 10 may apply one or more carrier edge services such as firewall, carrier grade network address translation (CG-NAT), media optimization, IPSec/VPN, subscriber management, etc., and load balancing of packet flows among one or more servers that provide the subscriber services. Stateless load balancer 14 performs load balancing of flows 26 among the servers 12 to balance the distribution of flow processing among the servers 12 for the servers. Stateless load balancer 14 of service node 10 is "stateless" because the stateless load balancer 14 does not store, in the general case, state data that maps a particular flow to a particular one or servers 12 such that stateless load balancer 14 may direct subsequent packets for the flow to the mapped server 12. Instead, in the general or steady-state case, stateless load balancer 14 processes each packet for flows 26 without using state data created based on previous packets of flows 26 while nevertheless maintaining flow affinity for flows 26 to servers 12.

As one example, to load balance a packet in the general case, stateless load balancer 14 applies a hashing function the packet. In some examples, stateless load balancer 14 applies the hashing function to the packet by applying the hashing function to an n-tuple of the packet. As used herein, "hash a packet" or similar phrase refers to an operation to apply the hashing function to the packet, e.g., to one of the n-tuples (e.g., n-IP-tuples) of the packet.

Each hash index (or "hash bucket") of the hashing function maps to a single one of servers 12, and service node 10 forwards the packet to the one of servers 12 mapped to the hash index for the n-tuple of the packet. Because the n-tuple for each packet in a flow is equivalent, the stateless load balancer 14 may in this way consistently distribute packets for the packet flow to the same one of servers 12 and facilitate service continuity for the session. As used herein, to "hash a packet to a hash index" or similar phrase refers to an operation to apply the hashing function to the packet to determine the hash index for the packet.

In the example of FIGS. 1A-1B, service node 10 distributes packets for flow 26A to server 12A. Forwarding of packets for flow 26B is discussed in further detail below.

Service node 10 may determine that server 12N has failed, i.e., is no longer able to provide services. This failure is indicated in FIG. 1A as an 'X' superimposed upon failed server 12N. In response to determining the failure of server 12N, stateless load balancer 14 redistributes the hash indexes mapped to the failed server 12N to the remaining, as yet active servers 12 still able to provide services. Each redistributed hash index is thus at least temporarily mapped to a substitute server 12 (i.e., not the failed server 12N). Such failure may be the result of the server 12N failing to a communication failure with regard to server 12N.

In accordance with one example of the techniques described in this disclosure, stateless load balancer 14 marks the redistributed hash indexes to prescribe flow learning for any flows hashed to the redistributed hash indexes. If flow learning is prescribed for a particular hash index, stateless load balancer 14 stores a mapping for any flow that is hashed to that hash index while flow learning is required. Stateless load balancer 14 stores each such mapping as an entry to a flow table 15, and each mapping entry maps a flow to the substitute server for a redistributed hash index to facilitate flow affinity for subsequent packets of the flow that are received by the service node.

As illustrated in the example of FIG. 1A, in the steady state condition prior to determining the failure of server 12N, stateless load balancer 14 would hash packets for flow 26B to a hash index mapped to server 12N. This steady state condition is shown by a dashed arrow for flow 26B' to indicate that service node 10 would forward packets for this flow 26B' to server 12N under non-failure conditions. However, because server 12N has failed and service node 10 has determined the failure, stateless load balancer 14 redistributes the hash index to map the hash index to still active server 12A and also marks the hash index to prescribe flow learning. Consequently, when service node 10 receives an initial packet for flow 26B subsequent to determining the failure of server 12N, stateless load balancer 14 hashes the initial packet to the redistributed hash index mapped to server 12A and therefore forwards the initial packet to server 12A rather than to server 12B.

In addition, as described above, because the hash bucket to which stateless load balancer 14 hashed the initial packet is marked to prescribe flow learning, stateless load balancer 14 generates a mapping that temporarily maps flow 26B to server 12A for the duration of flow 26B. Stateless load balancer 14 stores the generated mapping to flow table 15. In this way, flow table 15 may be used to temporarily store state data as a result of a failure or other network event that causes loss of communication with one or more servers 12. The temporary state data of flow table 15 may be used to effectively override the stateless load balancing operation of service node 10.

As service node 10 receives subsequent packets for flow 26B, prior to applying the hashing function to the subsequent packets, stateless load balancer 14 first queries the flow table 15 to determine whether a mapping for flow 26B is present in the flow table 15. Because the flow table 15 includes the mapping that maps flow 26B to server 12A, stateless load balancer 14 directs service node 10 to continue forwarding the subsequent packets to server 12A. For packets of flows for which a mapping is not present in flow table 15, e.g., flow 26A, stateless load balancer 14 hashes the packets to the appropriate server 12.

As illustrated in FIG. 1B, server 12N may recover during the pendency of flow 26B. Upon service node 10 determining that server 12N has recovered, stateless load balancer 14 restores any hash indexes having redistributed mappings to remap such hash indexes to server 12N and also to remove the flow learning directive for such hash indexes. Stateless load balancer 14 restores the mapping for the hash index to which stateless load balancer 14 hashes packets of flows 26B so as to again map to server 12N rather than to server 12A, for instance. Nevertheless, because stateless load balancer 14 first queries flow table 15 having a mapping entry that maps flow 26B to server 12A, stateless load balancer 14 continues to direct service node 10 to forward packets for flow 26B to server 12A rather than to server 12N as contraindicated by the restored hash index.

When the session for flow 26B terminates, stateless load balancer 14 may remove the mapping entry for flow 26B from flow table 15. As a result, stateless load balancer 14 may direct subsequently-initiated flows that match flow 26B to server 12N. For new flow 26C received by service node 10 subsequent to the recovery of server 12N, for instance, stateless load balancer 14 may hash flow 26C to the same restored hash index to which flow 26B hashes. Because flow 26C unlike flow 26B does not have a corresponding entry in flow table 15, stateless load balancer 14 forwards packets of flow 26C to server 12N.

By applying the above-described techniques, stateless load balancer 14 of service node 10 may improve the resiliency of the stateless load balancing service. In addition, because such flow learning is temporary lasting for the duration of a server failure, the flow learning may be relatively more scalable when contrasted with stateful load balancing, which may allow service node 10 to maintain the high-throughput provided by stateless load balancing while also enabling flow affinity for flows in the event of a server recovery and hash index restoration. Put another way, the techniques applied by stateless load balancer 14 may permit new flow sessions to be anchored to restored server 12N while continuing to forward packets for existing flow 26B to server 12A. The stateless load balancing and flow learning techniques described herein may therefore provide a more complete solution vis-á-vis conventional stateless load balancing.

Figure 2:
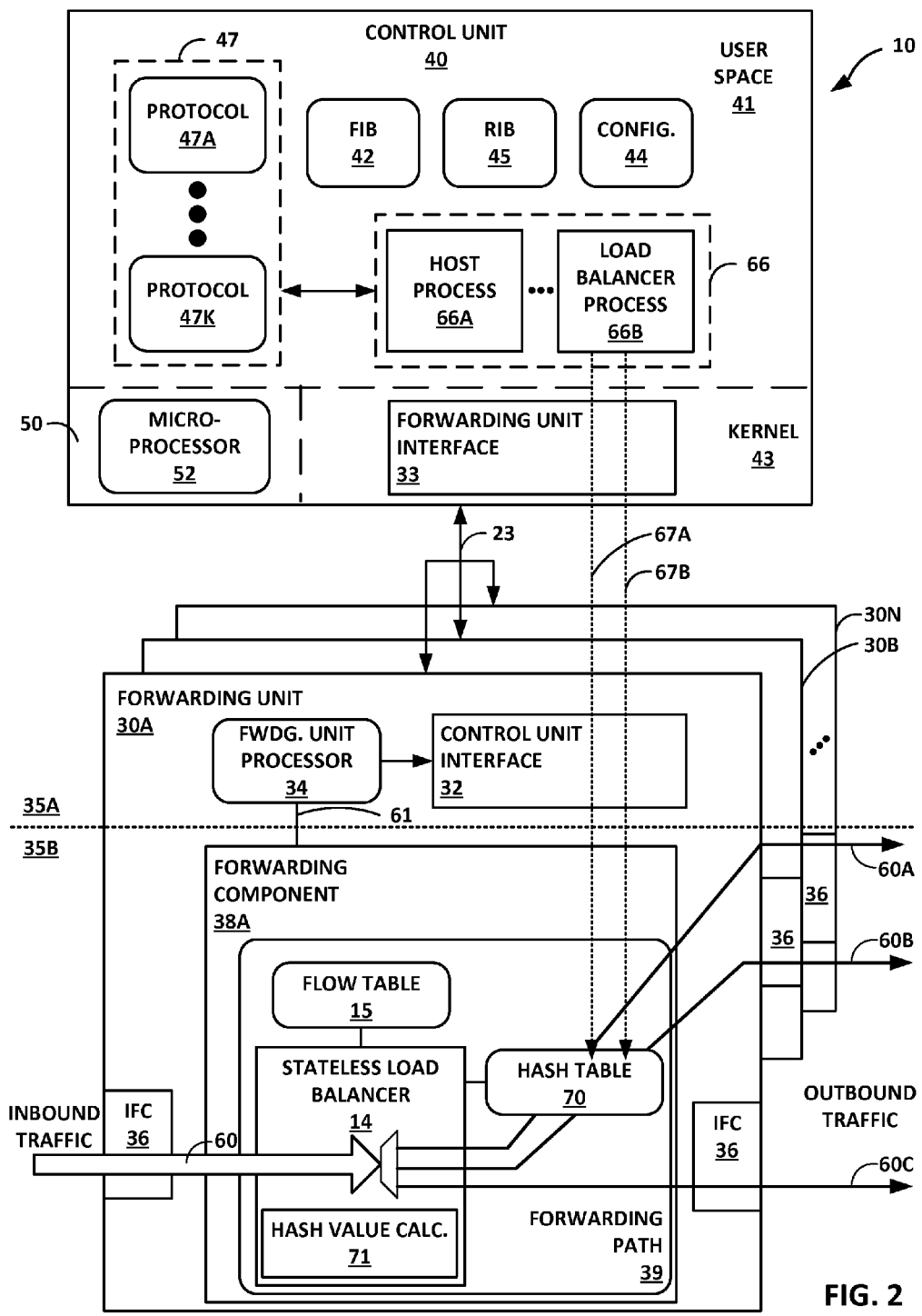
FIG. 2 is a block diagram illustrating an example service node that applies stateless load balancing according to techniques described herein.

FIG. 2 is a block diagram illustrating an example service node that applies stateless load balancing according to techniques described herein. Service node 10 illustrated in FIG. 2 may represent an example instance of service node 10 of FIG. 1 in further detail.

In this example, control unit 40 includes a combination of hardware and software that provides a control plane 35A operating environment for execution of one or more user-level host processes 66, of which host process 66A and load balancer process 66B are provided as examples, executing in user space 41. By way of example, host processes 66 may include a command-line interface and/or graphical user interface process to receive and respond to administrative directives in accordance with one or more of protocols 47, a routing protocol module to execute one or more routing protocols of protocols 47, a network management process to execute one or more network management protocols of protocols 47, an address resolution protocol (ARP) process to respond to ARP requests according to an ARP protocol of protocols 47, a subscriber management process to manage subscriber session setup and maintenance in accordance with one or more subscriber session management protocols (e.g., GPRS Tunneling Protocol-C(ontrol)), and so forth. In this respect, control unit 40 may provide routing plane, service plane, and management plane functionality for service node 10.

Host processes 66, including load balancer process 66B, execute on and interact with kernel 43, which provides a run-time operating environment for user-level processes.

Kernel 43 may represent, for example, a UNIX operating system derivative such as Linux or Berkeley Software Distribution (BSD). Kernel 43 offers libraries and drivers by which host processes 66 may interact with the underlying system. Hardware environment 50 of control unit 40 includes microprocessor 52 that executes program instructions loaded into a main memory (not shown in FIG. 2) from a storage device (also not shown in FIG. 2) in order to execute the software stack, including both kernel 43 and user space 41, of control unit 40. Microprocessor 52 may represent one or more general- or special-purpose processors such as a digital signal processor (DSP), an application specific integrated circuit (ASIC), a field programmable gate array (FPGA), or any other equivalent logic device. Accordingly, the terms "processor" or "controller," as used herein, may refer to any one or more of the foregoing structures or any other structure operable to perform techniques described herein.

In this example, a routing protocol process of host processes 66 executes one or more interior and/or exterior routing protocols to exchange routing information with other network devices and store received routing information in routing information base 45 ("RIB 45"). RIB 45 may include information defining a topology of a network, including one or more routing tables and/or link-state databases. The routing protocol process resolves the topology defined by routing information in RIB 45 to select or determine one or more active routes through the network and then installs these routes to forwarding information base 42 ("FIB 42"). Typically, the routing protocol process generates FIB 42 in the form of a radix or other lookup tree to map packet information (e.g., header information having destination information and/or a label stack) to next hops and ultimately to interface ports of interface cards associated with respective forwarding units 30A-30N.

Service node 10 also includes a plurality of forwarding units 30A-30N (collectively, "forwarding units 30") and a switch fabric (not shown) that together provide a forwarding plane 35B for forwarding network traffic. Forwarding units 30 connect to control unit 40 in this example by communication links 23, which may represent an Ethernet network.

Each of forwarding units 30 may include substantially similar components performing substantially similar functionality, said components and functionality being described hereinafter primarily with respect to forwarding unit 30A illustrated in detail in FIG. 2. Forwarding unit 30A receives and sends network packets via interfaces of interface cards (IFCs) 36 of forwarding unit 30A. Forwarding unit 30A also includes forwarding component 38A, which represents hardware or a combination of hardware and software that provide high-speed forwarding of network traffic. Likewise, forwarding unit 30B includes IFCs 36 and forwarding component 38B, and so on. In some examples, one or more of forwarding units 30 may each include multiple forwarding components substantially similar to forwarding component 38A. Example forwarding units include flexible programmable integrated circuit (PIC) concentrators (PFCs), dense port concentrators (DPCs), and modular port concentrators (MPCs). Forwarding units 30 may be alternatively referred to as line cards.

Each of IFCs 36 may include interfaces for various combinations of layer two (L2) technologies, including Ethernet, Gigabit Ethernet (GigE), and Synchronous Optical Networking (SONET) interfaces. In various aspects, each of forwarding units 30 may include more or fewer IFCs. In some examples, each of forwarding components 38 is associated with different IFCs of the forwarding unit 30 on which the forwarding component 38 is located. The switch fabric (again, not shown) connecting forwarding units 30 to one another provides a high-speed interconnect for forwarding incoming transit network packets to the selected one of forwarding units 30 for output over a network interface.

Forwarding units 30 demarcate control plane 35A and forwarding plane 35B of service node 10. That is, forwarding unit 30A performs functions of both control plane 35A and forwarding plane 35B. In general, forwarding component 38A and IFCs 36 implement forwarding plane 35B for forwarding unit 30A, while forwarding unit processor 34 (illustrated as "fwdg. unit processor 34") executes software including control unit interface 32 that implement portions of control plane 35A within forwarding unit 30A. Control unit 40 also implements portions of control plane 35A of service node 10. Forwarding unit processor 34 of forwarding unit 30A manages forwarding component 38A and executes instructions to provide a control unit interface 32 to control unit 40 and handle host-bound or other local network packets. Forwarding unit processor 34 may execute a microkernel for forwarding unit 30A. Bus 61 represents a communication link that enables communication of network packet data and metadata and signaling messages between forwarding unit processor 34 and forwarding component 38A. Bus 61 may include a DMA bus and be controlled, at least in part, by a DMA chip for direct memory copying of stored packet data to computer-readable storage memory (not shown) controlled by forwarding unit processor 62 for analysis and/or to await transport to control unit 40 via communication links 23.

Forwarding component 38A may include programmable ASIC-based packet processors that process network packets by performing a series of operations on each packet over respective internal packet forwarding paths as the packets traverse the internal architecture of service node 10. Forwarding component 38A includes forwarding structures that, when executed, examine the contents of each packet (or another packet property, e.g., incoming interface) and on that basis make forwarding decisions, apply filters, and/or perform accounting, management, traffic analysis, and load balancing, for example. In one example, each of forwarding components 18 arranges forwarding structures as next hop data that can be chained together as a series of "hops" along an internal packet forwarding path for the network device. The result of packet processing determines the manner in which a packet is forwarded or otherwise processed by forwarding components 18 from its input interface on one of forwarding units 30 to its output interface on one of forwarding units 30.

Forwarding component 38A identifies packet properties and performs actions bound to the properties. Forwarding component 38A executes microcode (or "microinstructions") to control and apply fixed hardware components of the ASICs to process packet "keys." A packet key includes packet fields and other parameters that determine a flow of packet processing for the packet along an internal forwarding path. Internal forwarding path 39 ("forwarding path 39") comprises programmed, executable microcode and fixed hardware components that determine the packet processing actions and other operations performed by forwarding component 38A. Forwarding path 39 may include memory logic to store state, configuration data, tables, and so forth. Forwarding path 39 may include, for example, executable instructions, programmable logic, and application-specific logic that perform lookups, rate limit packet flows (e.g., using policers), and manipulate packet keys, among other functions. Internal forwarding paths of service node 10 may include combinations of respective forwarding paths 39 of multiple different forwarding components 38A. In other words, forwarding path 39 of forwarding component 38A may include only a part of the overall internal forwarding path of service node 10 for various packet flows.

An administrative interface process of processes 66, such as a command-line interface or graphical user interface, executes to receive configuration data, which administrative process stores to configuration data 44 (illustrated as "config. 44"). The configuration data may include server load balancing configuration information. Server load balancing configuration information identifies a set of one or more servers, e.g., servers 12 of FIG. 1, associated with a common interface. The server load balancing configuration may identify each of the set of servers by a server identifier that may be, for instance, an IP address (IPv4/IPv6, e.g.), a tunnel identifier, a server farm identifier, or any other server information that enables forwarding units 30 to forward packets to the identified server. For each identified server, the server load balancing configuration may include server capability information that specifies the maximum number of connections, capacity expressed as a percentage of the set of servers, failure indications, and so forth. Load balancer process 66B may use server capability information when apportioning hash indices of hash table 70 among the load-balanced servers. For example, load balancer process 66B may apportion more hash indices to a higher-capacity server. The server load balancing configuration may further identify the common interface, which may include an IP address, IP address/port combination, tunnel identifier, pseudowire identifier, or any other information that enables forwarding units 30 to identify packets that are to be load balanced among the set of servers, e.g., servers 12 of FIG. 1. The common interface may alternatively be referred to as a virtual server, which provides the subscriber service by operations of the set of load-balanced servers.

Load balancer process 66B operating in conjunction with stateless load balancer 14 and other components of service node 10 of FIG. 2 may represent an example instance of stateless load balancer 14 of FIG. 2. Load balancer process 66B of control unit 40 may invoke forwarding unit interface 33 to program forwarding path 39 of forwarding component 38A with hash table 70, which includes an entry for each of N hash values for a hash function applied by stateless load balancer 14. Because each hash value is associated with a different hash table 70 entry, each the hash value range may considered an index to hash table 70. Accordingly, the hash values for the hash function are alternatively referred to as "hash indices." The value for N may be configurable. One example value for N is 256. Each hash table 70 is associated with one of the N hash indices, and load balancer process 66B configures each entry to specify one of the identified servers for load balancing according to configuration data 44. Entries may specify servers by a forwarding next hop structure for forwarding path 39 or by a network address, for instance. Each hash table 70 entry also includes a flow-learning-required flag (e.g., bit) to indicate whether flow learning is prescribed, in accordance with techniques described in this disclosure. For example, a set flow-learning-required flag for a hash table 70 entry may indicate that flow learning is prescribed for the hash index associated with the hash table 70 entry.

Flow table 15 includes zero or more entries configured to map an identified packet flow to one of the servers mapped in hash table 70. Flow table 15 may represent an example instance of flow table 15 of FIG. 1. Use of flow table 15 by stateless load balancer 14 is described in further detail below.

In the example service node 10 of FIG. 2, stateless load balancer 14 represents logic of forwarding path 39 for distributing packet flows among a set of identified servers that provide a common service to clients/subscribers, e.g., servers 12 of FIG. 1. Stateless load balancer 14 executed by forwarding component 38A may provide increased throughput over a load balancing processes executed by a general-purpose processor, in some cases by an order of magnitude or more. However, memory and throughput constraints within the forwarding component 38A may prevent the use of "stateful" load balancing in a scalable manner. Forwarding components 38A is therefore configured with stateless load balancer 14 that applies stateless load balancing to received packets in the general case.

Forwarding unit 30A receives inbound packets (collectively, "inbound traffic") by IFCs 36, and forwarding component 38A processes the inbound packets using internal forwarding path 39. Forwarding component 38A executing forwarding path 39 identifies inbound packets destined for the common interface for the set of load-balanced servers configured in hash table 70 by load balancer process 66B. Service node 10 is configured to apply traffic load balancing to inbound packets identified in this way. Accordingly, forwarding component 38A directs the identified inbound packets (illustrated collectively as packet flows 60) to stateless load balancer 14, which load balances individual packet flows 60A-60C among multiple load-balanced servers. In some cases, outbound packet flows 60 egress service node 10 by another one of forwarding units 30B-30N rather than by ingress forwarding unit 30A for the illustrative packet flows 60. In other words, any of forwarding units 30 may ingress and/or egress packet flows being load-balanced. Forwarding components 38 may look up outbound interfaces for and forward transit network packets as outbound traffic via the outbound interfaces of IFCs 36.

Each packet flow includes one or more packets classifiable by stateless load balancer 14 as matching a set of one or more properties. Different packet flows may be classified using different properties and property values. For example, some packet flows may be identified as matching a standard 5-tuple (or subset thereof) consisting of transport layer protocol, source IP address, destination IP address, source port, and destination port. Some packet flows may be further distinguished by incoming interface or Multiprotocol Label Switching (MPLS) labels, for example. Stateless load balancer 14 may classify flows according to a configuration of service node 10 as well as the properties of the packets of the flows to which stateless load balancer 14 applies the hash function.

For each received packet to be load-balanced, stateless load balancer 14 queries flow table 15 to determine whether the packet is classified as part of a packet flow that is mapped in a flow table 15 entry to one of the load-balanced servers. If the packet is not classified as such, then stateless load balancer 14 applies a hash function to one or more fields of the packet. For example, stateless load balancer 14 may apply the hash function to any n-tuple of the packet. In some cases, the stateless load balancer 14 may apply the hash function to the full 5-tuple of the packet, which is also referred to as an Equal-Cost Multipath (ECMP) hash. Hash value calculator 71 of stateless load balancer 14 computes the hash function for the input (e.g., the selected n-tuple for the packet), which outputs a hash value that is an index to one of the entries of hash table 70. Hash value calculator 71 is configured to output a hash value within a range corresponding to the number of entries of hash table 70, which may be alternatively referred to as hash buckets. In other words, the hash value calculator 71 computes an index into hash table 70. Hash value calculator 71 may compute the hash function using, e.g., SHA-1, MD5, or a cyclic redundancy check such as CRC32 or CRC64.

Stateless load balancer 14 uses the computed hash value to determine the hash table 70 entry associated with the computed hash value. Stateless load balancer 14 determines the server identifier for the server mapped to the associated hash table 70 entry, and forwarding component 38A forwards the packet to the identified server. In addition, if the flow-learning-required flag of the determined hash table 70 entry indicates that flow learning is prescribed, stateless load balancer 14 generates and adds a new flow table 15 entry that maps the packet flow of the packet to the identified server. As a result, stateless load balancer 14 directs subsequent packets of the packet flow to the identified server even if hash table 70 is reconfigured, in order to maintain flow affinity for the flow.

If stateless load balancer 14 determines, upon querying flow table 15, that the packet is classified as part of a packet flow that is mapped in a flow table 15 entry to one of the load-balanced servers, then the stateless load balancer 14 directs the packet to the mapped server. In this way, the stateless load balancer 14 maintains flow affinity for the flow.

Service node 10 may receive an indication that a server from the set of load-balanced servers configured in configuration data 44 has failed. For example, load balancer process 66B or another one of user processes 66 may fail to connect to the failed server (in some cases after repeated attempts), which indicates that the failed server has failed. As another example, load balancer process 66B or another one of user processes 66 may issue Real Time Performance Monitoring (RPM) probes. Because the server has failed, load balancer process 66B redistributes hash table 70 entries, which represent hash buckets for the hash function computed by stateless load balancer 14, among the remaining servers of the set of load-balanced servers that have not failed. To redistribute the hash table 70 entries, load balancer process 66B issues redistribute message 67A that specifies new mappings for the redistributed hash table 70 entries previously mapped to the failed server. In addition, redistribute message 67A specifies that the flow-learning-required flag is to be set to indicate that flow learning is prescribed for each of the redistributed hash table 70 entries. New packet flows hashed to the redistributed hash table 70 entries will, as a result, trigger stateless load balancer 14 to generate new flow table 15 entries for such new packet flows. Redistribute message 67A may represent one or more signaling message issued send from control unit 40 to forwarding unit 30A. Forwarding unit processor 34 may program the hash table 70 with the new mappings specified by redistribute message 67A.

Load balancer process 66B may subsequently determine that the failed server has resumed operation and is again able to provide the subscriber service. Load balancer process 66B may therefore issue restore message 67B that restores redistributed hash table 70 entries with the original mappings. That is, restore message 67B may remap the hash values associated with the redistributed hash table 70 entries to the server that has resumed operation as determined by load balancer process 66B. In addition, restore message 67B specifies that the flow-learning-required flag is to be cleared to indicate that flow learning is no longer prescribed for each of the previously redistributed hash table 70 entries. Restore message 67B may represent one or more signaling message issued send from control unit 40 to forwarding unit 30A. Forwarding unit processor 34 may program the hash table 70 with the restored mappings specified by restore message 67B.

For a flow mapping stored to flow table 15, stateless load balancer 14 may use Transmission Control Protocol (TCP) flags and/or timers to determine that a session for the packet flow mapped by the flow mapping has terminated. In response to this determination, stateless load balancer 14 may delete the flow mapping stored to flow table 15.

Figure 3A:
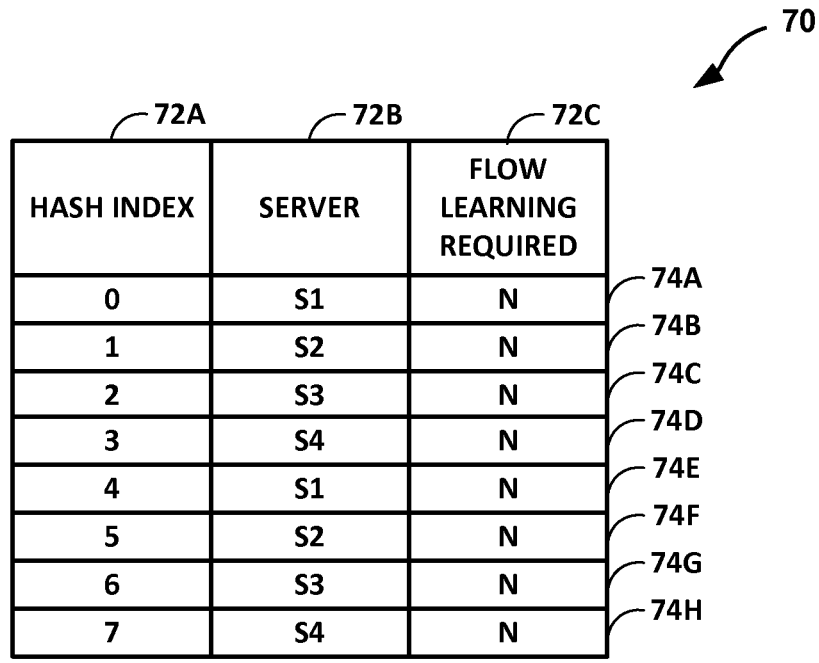
FIGS. 3A-3B are block diagrams each illustrating a hash table configured in accordance with techniques described in this disclosure.
Figure 3B:
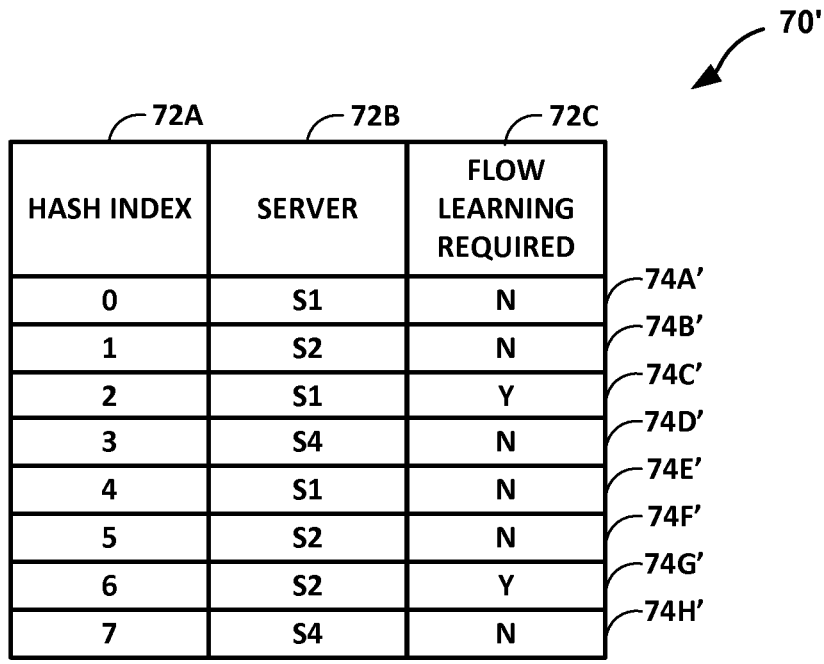

FIGS. 3A-3B are block diagrams each illustrating example hash tables configured in accordance with techniques described in this disclosure. In these examples, hash table 70 and hash table 70' may illustrate, in detail, example instances of hash table 70 of FIG. 2 having different configurations. Hash table 70 is an associative data structure, such as a table, list, map, etc., that associated fields 72A-72C with one another for each hash table 70 entry. Hash table 70 of FIG. 3A illustrates hash table 70 at a steady-state configuration and includes hash table entries 74A-74H (collectively, "hash table entries 74") associated with the eight hash buckets of an example hash function applied by stateless load balancer 14 according to any of FIGS. 1-2. This association is indicated in FIGS. 3A-3B by a hash index value in hash index field 72A. For example, hash table entry 74B corresponds to hash value=1 of the hash function as indicated by the value in hash index field 72A. In some examples, hash index field 72A may be implemented using a memory offset or other indexing techniques rather than by storing a hash index value. The hash function may be configured to have more or fewer hash buckets; the number of hash table entries 74 may be sized according to the number of hash buckets.

Each of hash table entries 74 maps a hash index value to a server identifier indicated by server field 72B. For example, flow table entry 74C maps hash index value "2" to server "S3". Server identifiers are illustrated in server field 72B using an abstract notation, "S1", "S2", etc. However, the server identifiers for hash table entries 74 illustrated in server field 72B may represent an IP address or other identifier for the server, as described above.

In this example, each of hash table entries 74 also includes a flow-learning-required flag to indicate whether the stateless load balancer 14 is to apply flow learning and utilize temporary state for flows that hash to the respective hash table entry 74. The flow-learning-flag value is indicated by flow learning required field 72C. A no ("N") value indicates that flow learning is not required. A yes ("Y") value indicates that flow learning is required. In the steady-state configuration represented by hash table 70 of FIG. 3A, none of hash table entries 74 indicates that stateless load balancer 14 is to apply flow learning.

Hash table 70' of FIG. 3B illustrates hash table entries 74' modified over hash table entries 74 upon service node 10 determining that server "S3" has failed, i.e., the server "S3" itself has failed or some other event is otherwise preventing communication with server "S3." Service node 10 in this case redistributes the hash buckets for the hash function among the load balanced servers "S1", "S2", "S3", and "S4" by remapping hash table entries 74C, 74G to servers "S1", "S2", respectively, as indicated by modified hash table entries 74C', 74G'. In addition, because hash table entries 74C', 74G' are remapped to a new server, service node 10 further configures hash table entries 74C', 74G' to set the flow-learning-required flag (indicated by the "Y" value for the hash table entries 74C', 74G') to prompt flow table learning for subsequent flows that hash to hash table entries 74C', 74G'. After subsequently determining server "S3" is again operative, service node 10 may restore hash table 70' of FIG. 3B by reconfiguring the hash table 70' to conform to hash table 70 of FIG. 3A.

Figure 4:
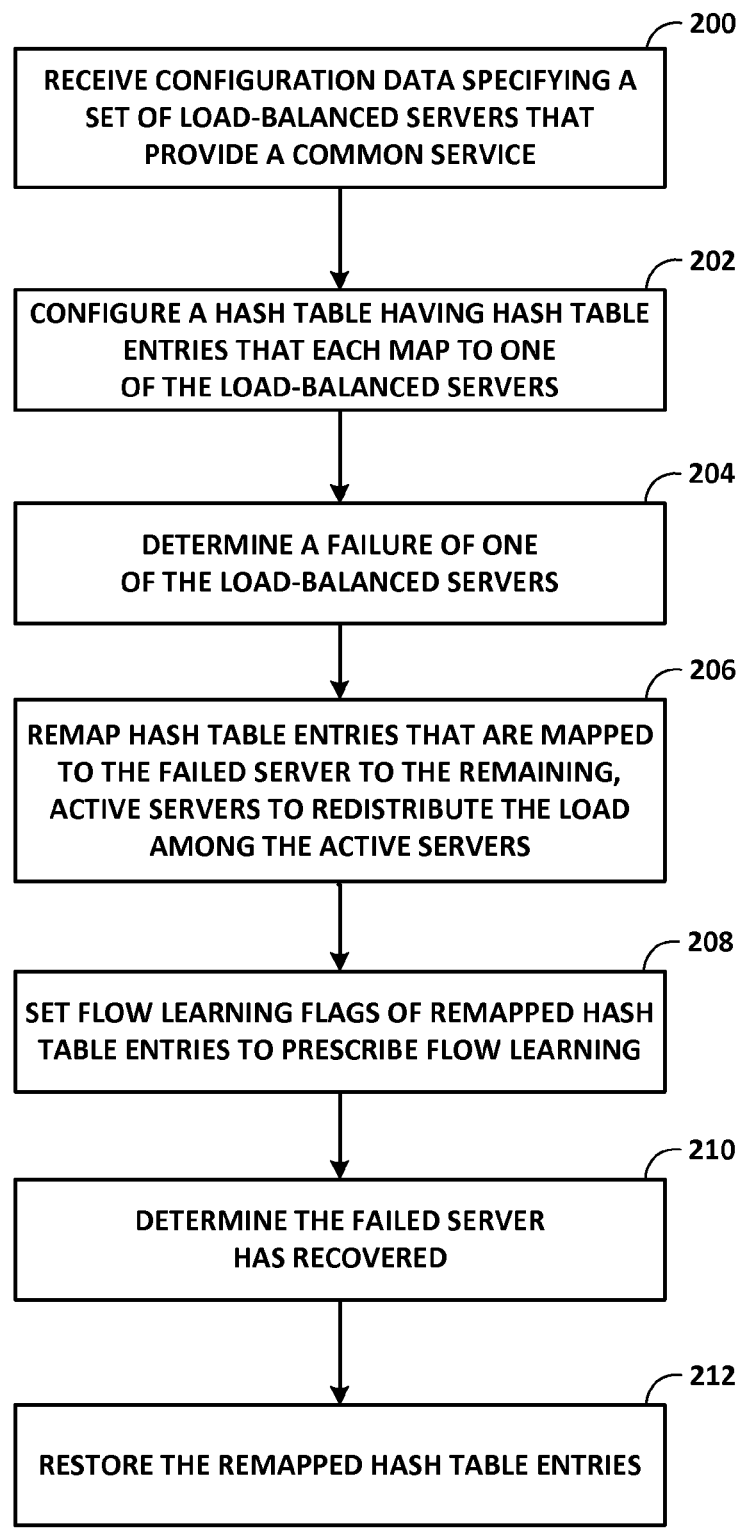
FIG. 4 is a flow chart illustrating an example mode of operation by a service node that implements adaptive stateless load balancing according to techniques described in this disclosure.

FIG. 4 is a flowchart illustrating an example mode of operation by a service node that implements adaptive stateless load balancing according to techniques described in this disclosure. The example mode of operation is described with respect to the example service node 10 of FIG. 2.

Initially, service node 10 receives configuration data that specifies a set of load-balanced servers that provide a common service (200). The configuration data may additionally specify a common interface (e.g. an IP address) that identifies packets directed to the common service. Using the configuration data, service node 10 configures hash table 70 to map hash values associated with respective hash table 70 entries to the servers (202). Stateless load balancer 14 may thereafter hash packets to the hash values and forward the packets to the mapped servers. The configuration data may be received, for example, by way of from an administrator by way of a local or remote interface or from a controller, such as a path computation element or software defined network (SDN) controller.

In response to determining that a server has failed (204), service node 10 redistributes the hash table 70 entries by remapping those entries currently mapped to the failed server to the remaining, active servers (206). In addition, service node 10 sets the flow-learning-flag for the redistributed, remapped hash table 70 entries to prescribe flow learning by stateless load balancer 14 of new flows that map to the redistributed, remapped hash table 70 entries.

Subsequently, service node 10 may determine that the failed server has recovered such that the failed server is again able to provide the common service (210). In response to determining that the failed server has recovered, service node 10 restores the redistributed, remapped hash table 70 entries to the steady-state configuration, which includes clearing the flow-learning-flag for the entries (212).

Figure 5:
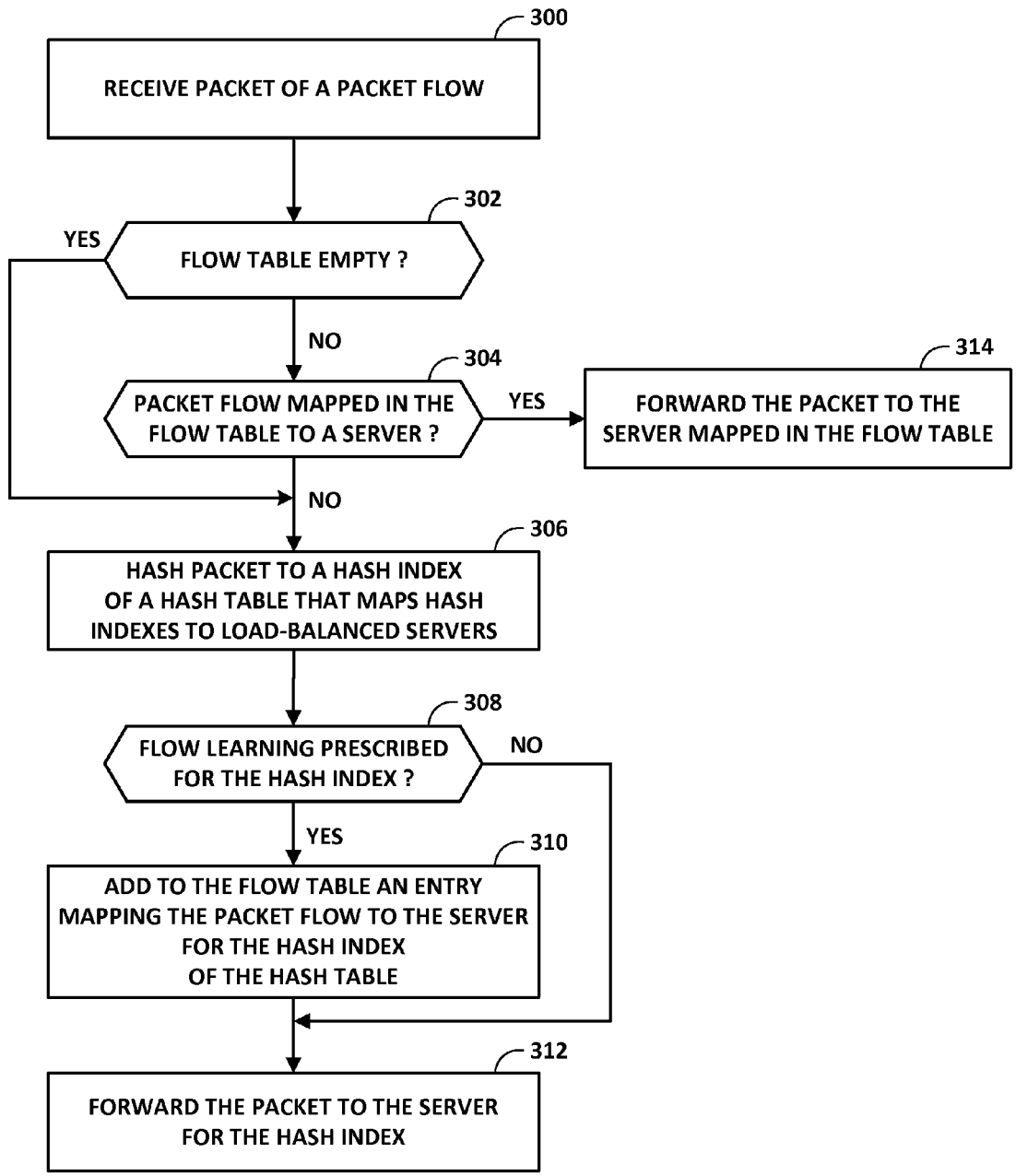
FIG. 5 is a flow chart illustrating an example mode of operation by a service node that implements adaptive stateless load balancing according to techniques described in this disclosure.

FIG. 5 is a flowchart illustrating an example mode of operation by a service node that implements adaptive stateless load balancing according to techniques described in this disclosure. The example mode of operation is described with respect to the example service node 10 of FIG. 2.

Stateless load balancer 14 of service node 10 receives a packet of a packet flow for processing (300) and, in response to receiving the packet, determines whether flow table 15 is empty (302). If the flow table 15 is not empty but rather includes one or more flow table 15 entries (NO branch of 302), stateless load balancer 14 determines whether any of the flow table 15 entries map the packet flow to a server (304). If so (YES branch of 304), stateless load balancer 14 directs service node 10 to forward the packet to the server to which the packet flow is mapped by the matching flow table 15 entry (314).

If the flow table 15 is empty (YES branch of 302) or if none of the flow table 15 entries map the packet flow to a server (NO branch of 304), then stateless load balancer 14 applies a hash function to the packet to compute a hash value corresponding to a hash index of hash table 70 (306). If the hash table 70 entry associated with the hash index has a flow-learning-required flag set to indicate that flow learning is prescribed for the hash index (YES branch of 308), stateless load balancer 14 adds a flow table 15 entry that maps the packet flow to the server to which the hash table 70 entry associated with the hash index maps, e.g., the server specified by the hash table 70 entry (310). If flow learning is not prescribed for the hash index (NO branch of 308), stateless load balancer 14 does not add the hash table 70 entry as described above. After hashing the packet to the hash index, stateless load balancer 14 forwards the packet to the server to which the hash table 70 entry associated with the hash index maps, e.g., the server specified by the hash table 70 entry (312).

The techniques described herein may be implemented in hardware, software, firmware, or any combination thereof. Various features described as modules, units or components may be implemented together in an integrated logic device or separately as discrete but interoperable logic devices or other hardware devices. In some cases, various features of electronic circuitry may be implemented as one or more integrated circuit devices, such as an integrated circuit chip or chipset.

If implemented in hardware, this disclosure may be directed to an apparatus such as a processor or an integrated circuit device, such as an integrated circuit chip or chipset. Alternatively or additionally, if implemented in software or firmware, the techniques may be realized at least in part by a computer-readable data storage medium comprising instructions that, when executed, cause a processor to perform one or more of the methods described above. For example, the computer-readable data storage medium may store such instructions for execution by a processor.

A computer-readable medium may form part of a computer program product, which may include packaging materials. A computer-readable medium may comprise a computer data storage medium such as random access memory (RAM), read-only memory (ROM), non-volatile random access memory (NVRAM), electrically erasable programmable read-only memory (EEPROM), Flash memory, magnetic or optical data storage media, and the like. In some examples, an article of manufacture may comprise one or more computer-readable storage media.

In some examples, the computer-readable storage media may comprise non-transitory media. The term "non-transitory" may indicate that the storage medium is not embodied in a carrier wave or a propagated signal. In certain examples, a non-transitory storage medium may store data that can, over time, change (e.g., in RAM or cache).

The code or instructions may be software and/or firmware executed by processing circuitry including one or more processors, such as one or more digital signal processors (DSPs), general purpose microprocessors, application-specific integrated circuits (ASICs), field-programmable gate arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, functionality described in this disclosure may be provided within software modules or hardware modules.

Various embodiments have been described. These and other embodiments are within the scope of the following examples.

What is claimed is:

1. A method comprising:
    applying stateless load balancing, by a service node according to a hash table having a plurality of hash table entries that each maps a hash value to a server of a plurality of servers that provide a common service, to packet flows to distribute the packet flows among a plurality of servers;
    modifying, by the service node in response to determining a failure of a failed server from the plurality of servers, a hash table entry from the plurality of hash table entries to prescribe flow learning for packet flows that match the hash value of the hash table entry;
    generating and storing, by the service node in response to receiving an initial packet for a new packet flow that matches the hash value of the hash table entry and determining the hash table entry prescribes flow learning for packet flows that match the hash value of the hash table entry, a flow table entry that maps the new packet flow to an active server from the plurality of servers; and forwarding, by the service node, the initial packet and subsequent packets of the new packet flow according to the flow table entry to override the stateless load balancing for the new packet flow.

2. The method of claim 1, further comprising:

configuring, by the service node, the hash table entries from the hash table such that each hash table entry from the hash table entries specifies one of the plurality of servers and indicates whether flow learning is prescribed; and modifying, by the service node in response to determining the failure of the failed server and that the hash table entry specifies the failed server, the hash table entry to instead specify the active server.

3. The method of claim 1, wherein generating and storing the flow table entry comprises:

hashing, by the service node, the initial packet to the hash table entry; and adding the flow table entry to a flow table for the service node.

4. The method of claim 1, wherein each of the hash table entries includes a flag indicating whether flow learning is prescribed for the hash table entry, and wherein modifying, by the service node, the hash table entry of the hash table that specifies the failed server to indicate that flow learning is prescribed for the hash table entry comprises setting the flag.

5. The method of claim 1, further comprising:

determining, by the service node, a recovery of the failed server; and after determining the recovery of the failed server and by the service node, restoring the hash table entry to specify the recovered, failed server and to indicate that flow learning is not prescribed for the hash table entry.

6. The method of claim 1, wherein generating and storing the flow table entry comprises:

adding the flow table entry to a flow table for the service node.

7. The method of claim 1, where forwarding the initial packet and the subsequent packets of the new packet flow according to the flow table entry to override the stateless load balancing for the new packet flow comprises:

querying, by the service node using the new packet flow, the flow table to identify the flow table entry that maps the new packet flow to the active server; and forwarding the subsequent packets of the new packet flow to the active server based at least on the flow table entry that maps the new packet flow to the active server.

8. The method of claim 1, further comprising:

determining, by the service node, a termination of the new packet flow; and deleting, by the service node and based at least on the determination of the termination of the new packet flow, the flow table entry from the flow table.

9. The method of claim 1, wherein the new packet flow comprises a first packet flow, the method further comprising:

determining, by the service node, whether a flow table for the service node includes at least one flow table entry;

receiving a packet for a second packet flow;

querying, by the service node and only if the flow table for the service node includes at least one flow table entry, the flow table to determine whether a flow table entry of the flow table maps the second packet flow to a server from the plurality of servers; and forwarding, by the service node and only if a flow table entry of the flow table maps the second packet flow to a server from the plurality of servers, the packet to the server from the plurality of servers.

10. A device comprising:

at least one network interface card;

a control unit comprising a processor and configuration data, wherein the configuration data associates a plurality of servers that provide a common service;

a forwarding unit coupled to the control unit and to the at least one network interface card, wherein the forwarding unit comprises a forwarding component configured to apply stateless load balancing according to a hash table having a plurality of hash table entries that each maps a hash value to a server from the plurality of servers to packet flows to distribute the packet flows among the plurality of servers; and a load balancer process executed by the control unit and configured to, in response to determining a failure of a failed server from the plurality of servers, modify a hash table entry from the plurality of hash table entries to prescribe flow learning for packet flows that match the hash value of the hash table entry, wherein the forwarding component is configured to generate and store, in response to receiving an initial packet for a new packet flow that matches the hash value of the hash table entry and determining the hash table entry prescribes flow learning for packet flows that match the hash value of the hash table entry, a flow table entry that maps the new packet flow to an active server from the plurality of servers, and wherein the forwarding component is configured to forward the initial packet and subsequent packets of the new packet flow according to the flow table entry to override the stateless load balancing for the new packet flow.

11. The device of claim 10, wherein each hash table entry from the hash table entries specifies one of the plurality of servers and indicates whether flow learning is prescribed, wherein the load balancer process is configured to, in response to determining the failure of the failed server and that the hash table entry specifies the failed server, modify the hash table entry to instead specify the active server.

12. The device of claim 10, wherein to generate and store the flow table entry the forwarding component is further configured to:

hash the initial packet to the hash table entry; and store the flow table entry to a flow table for the forwarding component.

13. The device of claim 10, wherein each of the hash table entries includes a flag indicating whether flow learning is prescribed for the hash table entry, and wherein to modify the hash table entry of the hash table that specifies the failed server to indicate that flow learning is prescribed for the hash table entry the forwarding component is further configured to set the flag.

14. The device of claim 10, wherein the load balancer process is further configured to determine a recovery of the failed server; and wherein the load balancer process is further configured to, after determining the recovery of the failed server, restore the hash table entry to specify the recovered, failed server and to indicate that flow learning is not prescribed for the hash table entry.

15. The device of claim 10, wherein to generate and store the flow table entry the forwarding component is further configured to:
   add the flow table entry to a flow table for the forwarding component.

16. The device of claim 10, where to forward the initial packet and the subsequent packets of the new packet flow according to the flow table entry to override the stateless load balancing for the new packet flow, the forwarding component is further configured to:
   query, using the new packet flow, the flow table to identify the flow table entry that maps the packet flow to the active server; and
   forward the subsequent packets of the new packet flow to the active server based at least on the flow table entry that maps the new packet flow to the active server.

17. The device of claim 10, wherein the forwarding component is further configured to:
   determine a termination of the new packet flow; and
   delete, based at least on the determination of the termination of the new packet flow, the flow table entry from the flow table.

18. The device of claim 10,
   wherein the new packet flow comprises a first packet flow,
   wherein the forwarding component is further configured to:
   determine whether a flow table for the forwarding component includes at least one flow table entry;
   receive a packet for a second packet flow;
   query, only if the flow table for the forwarding component includes at least one flow table entry, the flow table to determine whether a flow table entry of the flow table maps the second packet flow to a server from the plurality of servers; and
   forward, only if a flow table entry of the flow table maps the second packet flow to a server from the plurality of servers, the packet to the server from the plurality of servers.

19. The device of claim 10, wherein the device comprises one of a router, a service card installed within a router, an appliance, or a real server deployed at a service complex.

20. A non-transitory computer-readable medium comprising instructions for causing one or more programmable processors to:
   apply stateless load balancing, by a service node according to a hash table having a plurality of hash table entries that each maps a hash value to a server of a plurality of servers that provide a common service, to packet flows to distribute the packet flows among a plurality of servers;
   modify, by the service node in response to determining a failure of a failed server from the plurality of servers, a hash table entry from the plurality of hash table entries to prescribe flow learning for packet flows that match the hash value of the hash table entry;
   generate and store, by the service node in response to receiving an initial packet for a new packet flow that matches the hash value of the hash table entry and determining the hash table entry prescribes flow learning for packet flows that match the hash value of the hash table entry, a flow table entry that maps the new packet flow to an active server of the plurality of servers; and
   forward, by the service node, the initial packet and subsequent packets of the new packet flow according to the flow table entry to override the stateless load balancing for the new packet flow.

* * * * *